United States Patent [19]

Abbey

[11] Patent Number: 4,683,173
[45] Date of Patent: Jul. 28, 1987

[54] PROCESS FOR PREPARING A CATIONIC AMINE-STABILIZED LATEX THERMOSETTING ELECTROCOAT COMPOSITION, METHOD OF CATHODIC ELECTROCOATING AND RESULTANT PRODUCT

[75] Inventor: Kirk J. Abbey, Seville, Ohio

[73] Assignee: The Glidden Company, Cleveland, Ohio

[21] Appl. No.: 794,722

[22] Filed: Nov. 4, 1985

[51] Int. Cl.$^4$ .............. B32B 27/00; C08L 75/00
[52] U.S. Cl. ................ 428/425.8; 204/181.7; 428/423.1; 428/463; 524/457; 524/507; 524/812; 524/901; 525/124
[58] Field of Search ............. 524/457, 507, 812, 901, 524/336; 428/425.8, 463, 423.1; 525/124

[56] References Cited

U.S. PATENT DOCUMENTS 4,380,601  4/1983  Welsh et al. .................. 524/555
4,512,860  4/1985  Abbey et al. ................. 204/181 C
4,525,260  6/1985  Abbey et al. ................. 204/181.7

*Primary Examiner*—Theodore E. Pertilla
*Attorney, Agent, or Firm*—Thomas M. Schmitz

[57] ABSTRACT

The blocked isocyanate crosslinker commonly used in conventional electrocoat compositions are difficult to incorporate satisfactorily into latex paint compositions for such application. An improved homogenized feed process for incorporating such water insoluble crosslinking agents into the latex particle during emulsion polymerization of reactive (hydroxy functional) vinyl monomers provides thermosetting latex of high cleanliness. The invention pertains to an improved cationic, amine-stabilized electrocoating composition and process.

10 Claims, No Drawings

PROCESS FOR PREPARING A CATIONIC AMINE-STABILIZED LATEX THERMOSETTING ELECTROCOAT COMPOSITION, METHOD OF CATHODIC ELECTROCOATING AND RESULTANT PRODUCT

BACKGROUND OF THE INVENTION

The invention relates to thermosetting cationic latices useful in coatings and to an improved process for incorporating water insoluble blocked isocyanate crosslinking agents to provide amino-stabilized cationic latices of high cleanliness and stability.

Although water-borne cathodic resin systems are well known, the use of latex binders in cathodic electrocoating is quite new and has not yet achieved full commercial acceptance. Coassigned U.S. Ser. No. 513,621 filed July 14, 1983 (issued as U.S. Pat. No. 4,512,860 on Apr. 23, 1985), which gives background information on electrocoating and especially latex for cathodic deposition, is incorporated herein by reference. The term "latex" is defined as a polymer or copolymer prepared from one or more monomers in an aqueous environment by emulsion polymerization technique. Such latex, usually having an average particle size from about 800 Å to about 10,000 Å and an average molecular weight ranging from about 10,000 up to and above 250,000. Such latex is quite different from the water-reducible or ionizable polymers prepared, not in aqueous medium, but in solvent systems or neat. The latex water-reducible, cation-active polymers have been in commercial use for electrodeposition coatings for some time. The latex polymers and structured cation-active latices of the present invention are preferred over the commercial water-borne or water-reducible coatings. One advantage is improved flexibility and impact resistance. A second advantage is that the coating is more resistant to handling even before baking (Gacesa U.S. Pat. No. 4,175,018). Cationic latices are less stable than their anionic counterpart systems. For electrodeposition coatings, it is necessary to develop a clean latex that can be pumped and will be relatively insensitive to shear forces.

In a commercial operation, the coating is continuously sheared by centrifugal pumping which passes the material through ultrafiltration membranes at a rate of 35–40 gallons/min. Instability of the coating, leading to agglomeration of particles after shear, would cause fouling of the ultrafiltration membrane, application problems, and loss of coating properties. The term "stable cationic latex" or "stable cationic latex paint composition" in the context of the present invention means a latex that when subjected to shear forces and/or pumping will be substantially non-agglomerated as determined by the HB/DCP shear test using a disc centrifuge as described in coassigned application Ser. Nos. 716,664, now U.S. Pat. No. 4,579,889, and 716,665 filed Mar. 27, 1985, and which are incorporated herein by reference. The instant process provides an improved process for incorporation of non-polymerizable blocked isocyanate in a thermosetting latex prepared by emulsion polymerization and overcomes the deficiencies of stability and cleanliness of prior blend systems.

Electrocoating processes and compositions based on cation-active amino-stabilized synthetic latex are known in coassigned U.S. Pat. Nos. 4,512,860; 4,525,260; 4,511,446; and application Ser. No. 723,483 filed Apr. 15, 1985, now U.S. Pat. No. 4,624,762. It is known to crosslink such compositions with external blocked isocyanate crosslinkers such as isophorone diisocyanate blocked with epsilon caprolactam or conventional blocking agents (Column 5, U.S. Pat. No. 4,512,860). Such compositions include crosslinker blends of the blocked isocyanate with preformed latex or with pigment dispersant subsequently mixed with the preformed latex. Coassigned application Ser. No. 723,483 teaches a latex copolymerized with a polymerizable blocked isocyanate where the isocyanate portion becomes part of the polymer chain. U.S. Pat. No. 3,799,854 teaches electrodeposition of a mixture of blocked isocyanate and amino resins which subsequently crosslink on release of the isocyanate on curing.

Coassigned Ser. No. 677,872 filed Dec. 14, 1984, now abandoned, relates to non-latex systems of polymerizable blocked isocyanates polymerized either above or copolymerized with various vinyl unsaturated monomers optionally in the presence of epoxy-amine adducts. Such polymers, dispersed in water by acidification of the amine functionality, are useful for electrocoating metal substrate. These systems differ from the instant invention where the blocked isocyanate is not polymerizable and thus does not become part of the polymer latex chain.

Other art relates generally to polymerization techniques. U.S. Pat. No. 4,039,500 (Bassett et al) teaches a process for controlling molecular weight distribution of latex polymers by using multistep feeding which continuously varies the polymerizable composition where a chain transfer agent is used alone or in conjunction with a crosslinking agent. U.S. Pat. No. 3,562,235 (Ryan) teaches a multistage emulsion polymerization of acrylates to produce thermoplastic polymer. U.S. Pat. No. 4,355,142 (Khungar et al) relates to homogenizing monomer mixes for vinyl latex production. U.S. Pat. No. 3,970,628 (Connelly et al) teaches various thermosetting addition polymers copolymerized with epoxy resin and discusses various feed techniques such as monomer feed, emulsified monomer feed and single feed processes. These systems having acid functionality differ considerably from the amino-stabilized cationic latex of the instant invention.

BRIEF DESCRIPTION OF THE INVENTION

Briefly the invention relates to an improved process and electrocoat cationic amino-stabilized thermosetting latex comprising:
(1) 95 to 45 weight percent of a thermosetting latex polymer prepared in water by emulsion polymerization of vinyl monomers comprising non-functional monomers, monomers having functional groups adapted to cure with a latent blocked isocyanate and amine functional monomers which when ionized or neutralized with acid impart cationic properties to the latex; and
(2) 5 to 55 weight percent of a non-polymerizable water insoluble blocked isocyanate wherein (1)+(2) on a solids basis total 100 percent;
the improvement which comprises conducting said emulsion polymerization of said vinylic monomers in the presence of a water insoluble non-polymerizable latent blocked isocyanate by
(a) forming a course preemulsion of a blocked isocyanate in water with a surfactant and either at least a portion of one or more polymerizable monomers or with a non-polymerizable solvent;

(b) homogenizing said course preemulstion to produce a fine emulsion having an average particle size of less than 3 microns; and (c) emulsion polymerizing vinylic monomers in a reactor into which the said fine emulsion was previously batch charged or is being continuously fed over some interval of time concomitant with the emulsion polymerization.

DETAILED DESCRIPTION OF THE INVENTION

The present invention relates to thermosetting amino-stabilized cationic latex and to a method of incorporating isocyanate-type crosslinkers into cathodic-acrylic latex paint for electrocoating. Such latex is prepared by emulsion polymerization (aqueous medium) from vinylic monomers including at least a portion of hydroxy functional monomers adapted to crosslink with latent blocked isocyanate crosslinkers. The instant latex is cation-active by virtue of being amino-stabilized. By this is meant that such cation activity is provided fundamentally by a small proportion of amino, amidino, and/or guanadino functionality that is structurally a part of the latex molecule (usually derived from amino monomer component) and/or is sorbed onto the surface of the latex, as in the form of a surfactant (can result from azo initiators and other initiator fragments).

Previous attempts to incorporate blocked polyisocyanate crosslinking agent by first dissolving the agent in the monomer mix and polymerizing the monomers in water under emulsion polymerization conditions lead to separation (crystallization) of the crosslinker, grittiness, gellation and/or low conversion of the latex polymer. Deposited films remain uncured after baking. The improved latex, results from the use of a colloid mill to produce small droplet size, stable oil-in-water emulsions of the latent water insoluble blocked isocyanates. Useful emulsions include those prepared from water, surfactant, blocked isocyanate and vinyl monomer mix or from organic solvent solutions. Latexes prepared using these emulsions as a seed or feed for the emulsion polymerization of vinyl monomers were substantially free of grit, and gel and gave good conversion (>99%).

The term "latex" is understood to comprise a polymer or copolymer prepared from ethylenically unsaturated monomers in an aqueous environment by emulsion polymerization. The resin binder particles in a latex advantageously have a particle size from about 800 to 10,000 Å and were preferably in the 1,500 to 6,000 Å range. A cationic latex is a latex having a salt-forming precursor component, capable of being ionized with acid type reaction whereby the ionized salt portion helps to effect water dispersibility of the latex binder. When the salt-forming precursor, preferably a primary, secondary or tertiary amine portion, is part of the polymeric chain, then such latexes are said to be structurally cation active. When the cation portion is merely added as a non-polymeric unit, the latex is said to be cation active by the fact that the positively charged ions adsorb onto the surface of the polymer particle.

The vinyl monomers most useful in forming the structured cation latex include derivatives of acrylic acid and methacrylic acid, for example, methylmethacrylate, ethylmethacrylate, 2-ethylhexylmethacrylate, butylacrylate, isobornylacrylate, isobutyl methacrylate, and epoxy acrylates. Other suitable vinyl monomers include vinyl acetate, vinyl and vinylidene halides, e.g. vinyl chloride, vinylidene chloride; amides such as methacrylamide and acrylamide; hydrocarbons such as butadiene, styrene, vinyl toluene and the like. Large amounts of free acrylic and methacrylic acid are to be generally avoided as this can lead to instability in a cationic system. The non-functional vinyl monomers are present in weight percentages/basis total monomer solids of from about 45 to 95%.

Hydroxy functional monomers are preferred in providing functional latex adapted to react with the latent blocked isocyanates after application of the coating in the heat/cure cycle. Hydroxyl-containing monomers are ethylenically unsaturated monomers containing a hydroxyl and can include, for example, hydroxy alkyl acrylates or methacrylates such as hydroxyethyl, hydroxylpropyl, hydroxybutyl, hydroxyhexyl, hydroxyoctyl and similar lower alkyl hydroxy acrylates and methacrylates. The functional monomers can be present at up to 15 weight percent basis total monomers and preferably at from about 0.5 to 10%.

For structured cationic latex, additional vinyl monomers having base functionality are required in weight percentages of about 0.05% to 10%, preferably <1%, basis total monomer content. Amino groups are preferably incorporated in the vinyl monomers by using tertiary, secondary or primary amino functional acrylates, methacrylates and acrylamides such as, for example, dimethylaminoethyl methacrylate or acrylate, dimethylaminopropyl acrylamide or methacrylamide. Such amine functional monomers are copolymerized in an aqueous system to build an amino functionality into the acrylate polymer which, when partially or fully neutralized with an ionizer, impart the cationic properties to the acrylic latex. The preferred amine cation-precursor monomers are dimethylaminoethyl and diethylaminoethyl methacrylate.

The substantially water insoluble, non-polymerizable (by virtue of absence of ethylenic or vinylic unsaturation) latent blocked isocyanate crosslinking agents useful in the preparation of fine emulsions according to this invention are derived from a wide variety of isocyanates and/or mixtures thereof. These include, for example, isophorone diisocyanate; 2,4-tolylene diisocyanate; 2,6-tolylene diisocyanate; alkylene diisocyanates such as 1,4-tetramethylene-diisocyanate; 1,6-hexamethylene diisocyanate; 1,12-dodecane diisocyanate; cyclobutane and cyclohexane (1,3 and 1,4-) diisocyanates; phenylene diisocyanates (1,3- and 1,4-) and naphthalene-1,5-diisocyanate. Suitable blocking agents are those known in the art and include alcohols, phenols, ketoximes and the like. Especially preferred are 2-ethylhexyl alcohol and caprolactam. Preferred isocyanates include isophorone diisocyanate adduct with polyol such as trimethylolpropane and blocked with caprolactam and Hüls B-1370, a trimer of isophorone diisocyanate and blocked with acetone oxime (commercially available in hydrocarbon solvent). The ethylenically unsaturated monomers including reactive hydroxyl, or acrylamide monomers, and including cation precursor amine monomers, water, surfactant and ionizing acid are polymerized in the presence of aqueous emulsions of blocked isocyanates to produce an improved thermosetting latex coating composition. The resulting thermosetting compositions cure quickly at modest temperatures under either basic or acidic curing conditions although a faster cure results under basic conditions. The thermosetting composition can be used as a clear coating or as a pigmented coating and is particularly useful for the electrocoating of metal substrate.

The ethylenic monomers can be polymerized in the presence of emulsified blocked isocyanate at a pH preferably between about 1.0 and 6. Generally, the polymerization is conducted at a temperature of about 20°–100° C. in the presence of a free radical generating initiator. Commonly used free radical initiators include various peroxygen compounds such as the benzoyl peroxide, t-butyl hydroxyperoxide, cumene hydroperoxide, t-butyl diperphthalate, pelargonyl peroxide and 1-hydrocyclohexyl hydroperoxide; azo compounds such as azodiisobutyronitrile and dimethylazodiisobutyrate; and the like. Particularly preferred as polymerization initiators are the water-soluble cationic Azo initiators such as 2,2'-azobis(isobutyamidinium chloride), 2,2'-azobis(2-isopropyl imidazolinium)dichloride, 2,2'-azobis(2-aminopropane)dihydrogen sulfate, and the like. The amount of initiator used will generally be in the range between about 0.1 to 3% by weight based on the monomers and preferably is maintained between 0.15 and 0.8% by weight. Incremental addition or proportioning of the initiator is usually employed.

When an emulsifier is used to prepare the in-situ formed emulsion polymer of this invention, the emulsifiers are of the general types of cationic and non-ionic emulsifiers. Non-ionic emulsifiers such as octyl- or nonylphenyl polyethoxyethanol and the like may be used. The amount of emulsifier used may be from about 0.01 to 6% or more by weight of the monomers. All the emulsifier may be added at the beginning of the polymerization or it may be added incrementally or by proportioning throughout the run.

Preparation of Non-Polymerizable Crosslinking Emulsion

Emulsification of the crosslinker is an essential part of this invention. Emulsification of the water insoluble non-polymerizable blocked isocyanate can be effected in various ways. The following has been used extensively:

The emulsions containing water, surfactant, and crosslinker with solvent, were prepared in two stages. In the first stage a large droplet size preemulsion was made by slowly pouring surfactant solution into an approximately equal weight of Hüls B-1370 under vigorous agitation. Inversion occurs about half way through the surfactant solution addition. The mixing vessel was rinsed with surfactant solution before being filled with resin to reduce the tendency of the resin to adhere to the vessel walls.

In the second stage, the preemulsion is passed through the colloid mill, Gaulin Corp., Model No. 15M 8TA, several times to reduce the droplet size. After each pass, the emulsion is cooled to room temperature or below. The pressure settings are 200 kg/cm² in the first chamber and 300 kg/cm² in the second chamber. Emulsions prepared in this way did not settle noticeably for two months. The crosslinker emulsion particle size should be below 3 and preferably in the 0.1 to 0.5μ (micron) range.

Preparation of Latex

A typical Latex Synthesis is as follows although various modifications are possible as shown in the best mode examples: Water, surfactant, and acid were charged to a five-liter Morton flask equipped with a paddle stirrer, condenser, and thermometer and heated in a Therm-o-Watch controlled water bath at 75° C. The batches were sparged with nitrogen during heat up and blanketed thereafter. The heel was charged at 75° C. followed by the initiator five minutes later. The feeds of monomer, emulsion, and initiator/surfactant were started as soon as the exotherm began to decline and fed for about four hours. (Note: It is desirable to filter the emulsion to prevent blockage of the pump.) In some cases, the emulsion was charged at the start of the polymerization, but this is not preferred. The latexes were held at 75° C. for one hour after the last feed finished, then cooled to room temperature. After cooling, the latexes were filtered through a 200-mesh brass or stainless steel screen.

Preferred methods of incorporating the crosslinker emulsions are: feeding the emulsion into the polymerization reaction concomitant with the remaining monomer feed; first preparing a monomer seed and cofeeding emulsion and remaining monomer. A less preferred method is polymerizing on the emulsion which was used as a seed. The incorporation of the isocyanate emulsion to a preformed latex after polymerization is least preferred. Obviously this last approach can only be achieved with solvent emulsification.

The instant latexes can be fortified and stabilized as set forth in commonly assigned applications Ser. Nos. 716,664 and 716,665.

Aqueous coatings of the above type may be applied either by conventional coating techniques or by electrodeposition. The emulsion polymerization process makes use of a neutralizing acid during the latex synthesis to yield a product that is partially or completely neutralized. Phosphoric acid is the preferred inorganic acid and lactic acid is a preferred organic acid for the acidification or partial acidification to form the amino cation active polymer compositions.

Usually the cathodic resin composition will be present in water at concentrations from about 1% to about 30% by weight of resin although more concentrated aqueous compositions may be prepared for storage and shipping. Preferred useful concentrations are from 5 to 15 weight percent. The unpigmented compositions may be electrocoated to deposit clear coatings on the cathode. More commonly these compositions will be used in combination with various pigment compositions and other additives known to the electrocoating art. Conventional pigment-containing compositions include organic and inorganic pigments and additives such as titanium dioxide, oxides, carbon black, talc, barium sulfate as well as pigments or pseudo pigments known as plastic pigments such as polystyrene particles and the like.

In the electrocoating process the aqueous cathodic bath containing the neutralized cationic resin, pigments, additives, etc., is placed in contact with an electrically conductive anode, an electrically conductive cathode serving as the article to be coated. Current is applied (usually D.C.) at voltages between 50 and 500 volts whereby the organic resin migrates and is deposited on the metal substrate to be coated such as for example, steel, aluminum, iron and the like. Other bath components such as pigments, filler and additives are conveyed with the cationically charged resin and deposited on the substrate. After deposition the coating substrate is removed from the bath and rinsed with deionized water prior to effecting a cure. The deposited coatings cure at elevated temperatures by the usual techniques of heating in ovens or with infrared heaters.

The following examples are meant to illustrate the invention without implying any limitation therein. Unless otherwise defined, parts and percentages are expressed as weight percentages and temperatures are given as degrees Centigrade.

COMPARATIVE EXAMPLES

Examples 1-3 are latices which do not contain a crosslinker and are presented as representative of such latices. The process for making these latices and their composition with regard to all ingredients except crosslinker are within the range of the examples of this invention. Examples 4-6 are latices wherein conventional crosslinkers were dissolved in the monomer mixture that was fed into the polymerization reactor. They illustrate the failure of this direct approach when highly water insoluble crosslinkers are involved.

COMPARATIVE EXAMPLE 1

The following ingredients were used in the amounts specified:

| | |
|---|---|
| (a) Deionized water | 1925 g |
| Triton X405 (Trademark of Rohm & Haas) | 20 g |
| $H_3PO_4$, 85% | 2.1 g |
| (b) Deionized water | 58.2 g |
| AAP (2,2'-azobis(-2-amidinopropane) dihydrochloride) | 1.4 g |
| (c) BA (butyl acrylate) | 724 g |
| MMA (methyl methacrylate) | 270 g |
| ST (styrene) | 280 g |
| HPMA (hydroxypropyl methacrylate) | 121 g |
| DMAEMA (dimethylaminoethyl methacrylate) | 2.8 g |
| n-DDM (n-dodecyl mercaptan) | 2.8 g |
| (d) Deionized water | 117 g |
| AAP (2,2'-azobis(-2-amidinopropane) dihydrochloride) | 2.8 g |

These ingredients were combined and polymerized using the following procedure: Place (a) in a 5-liter Morton flask equipped with flat blade stainless steel stirrer, thermometer, condenser, nitrogen inlet, and hot water bath. Heat to 75° C. under a nitrogen blanket over one hour. Add 10% of (c), 140 g. and then (b) 5 minutes later. Note seed polymerization exotherm. Pump the rest of (c) and (d) in as parallel feeds over 4 and 4½ hours, respectively. Hold one hour at 75° C. Cool and filter through 200 mesh stainless steel screen. Responses for this and other comparative examples are collected in Table I.

COMPARATIVE EXAMPLE 2

The following ingredients were used:

| | |
|---|---|
| (a) Deionized water | 1953 g |
| Triton X405 (Trademark of Rohm & Haas) | 2.1 g |
| $H_3PO_4$, 85% | 2.1 g |
| (b) BA (butyl acrylate) | 10.4 g |
| MMA (methyl methacrylate) | 17.6 g |
| (c) Deionized water | 58.7 g |
| AAP (2,2'-azobis(-2-amidinopropane) dihydrochloride) | 1.4 g |
| (d) BA (butyl acrylate) | 706 g |
| MMA (methyl methacrylate) | 248 g |
| ST (styrene) | 280 g |
| HPMA (hydroxypropyl methacrylate) | 121 g |
| DMAEMA (dimethylaminoethyl methacrylate) | 2.8 g |
| n-DDM (n-dodecyl mercaptan) | 2.8 g |
| (e) Deionized water | 119.6 g |
| AAP (2,2'azobis(-2-amidinopropane) dihydrochloride) | 2.8 g |
| Triton X405 (Trademark of Rohm & Haas) | 19.3 g |
| (f) MMA (methyl methacrylate) | 14.0 g |
| AIBN (2,2'-azobis(isobutyronitrile)) | 2.8 g |
| (g) Deionized water | 3.5 g |
| DOWCIL 75 (Trademark of Dow Chemical Company) | 0.7 g |

These ingredients were combined and polymerized by the following procedure: Place (a) in a 5-liter Morton flask. Heat under nitrogen to 75° C. Add (b) and agitate. Five minutes later add (c). Watch for the exotherm in this seed preparation, then add (d) and (e) over 4 and 4½ hours, respectively. Hold the reaction mixture at 75° C. for 1 hour at which time (f) was added. The reaction temperature was held again for 1 hour before cooling. Ingredients (g) were added after the batch was at room temperature and before filtering through a 200 mesh stainless steel screen.

COMPARATIVE EXAMPLE 3

This example is similar to Comparative Example 2 except that no styrene monomer was used; the ingredients grouped as (f) and (g) were not used; and all surfactant was in (a). The procedure was the same as in Comparative Example 2 except that the batch was cooled and filtered 1 hour after completion of the feed (e). The following list shows the quantities of the ingredients used:

| | |
|---|---|
| (a) Deionized water | 1894.2 g |
| Triton X405 (Trademark of Rohm & Haas) | 21.3 g |
| $H_3PO_4$, 85% | 2.1 g |
| (b) BA (butyl acrylate) | 20.7 g |
| MMA (methyl methacrylate) | 35.3 g |
| (c) Deionized water | 58.7 g |
| AAP (2,2'-azobis(-2-amidinopropane) dihydrochloride) | 1.4 g |
| (d) BA (butyl acrylate) | 701.4 g |
| MMA (methyl methacrylate) | 519.5 g |
| HPMA (hydroxypropyl methacrylate) | 121.1 g |
| DMAEMA (dimethylaminoethyl methacrylate) | 2.8 g |
| n-DDM (n-dodecyl mercaptan) | 2.8 g |
| (e) Deionized water | 117.3 g |
| AAP (2,2'-azobis(-2-amidinopropane) dihydrochloride) | 2.8 g |

COMPARATIVE EXAMPLE 4

Hüls B-1370, an oxime blocked isocyanate crosslinker from Chemische Werke Hüls, was incorporated into the monomer mix of Comparative Example 1 at 140 g as supplied (contains ~30% solvent as butyl acetate and xylene). All other recipe components were identical to that of #1 as was the process of the polymerization. The results are included in Table I.

COMPARATIVE EXAMPLE 5

Exactly the same as Comparative Example 4 except that 140 g C-580, an adduct of trimethylol propane and isophorone diisocyanate blocked with E-caprolactam, was substituted for the Hüls B-1370. The C-580 contained no solvents.

COMPARATIVE EXAMPLE 6

Hüls B-1370 was used at 178.2 g as supplied and added to the components (d) of the above Comparative Example 3 with an insignificant reduction in the amount of methyl methacrylate by 0.8 g (i.e. a weighing error). The addition of surfactant Triton X405 was not the same as Comparative Example 3, but closer to the distribution in Comparative Example 2. Explicitly the surfactant was divided with 3.1 g, added in group (a), and 18.2 g added in group (e) of the ingredients. The processes were the same as that used in Comparative Example 3.

TABLE I
RESPONSES OF THE COMPARATIVE EXAMPLES

| Trial No. | Crosslinker | Styrene (PPH) | Conv. (%) | Grit (g) | Comments |
|---|---|---|---|---|---|
| 1 | None | 20 | 98 | .25 | — |
| 2 | None | 20 | 98 | .25 | — |
| 3 | None | 0 | 99 | 8.0 | Rubbery grit |
| 4 | B-1370 | 20 | 78 | 35 | Crystalline grit |
| 5 | C-580 | 20 | 98 | 58 | Crystalline grit |
| 6 | B-1370 | 0 | 96 | 87 | Crystalline grit |

FTIR analysis of the crystalline grit as found on trials 4–6 showed that the grit was essentially pure crosslinker with little or no acrylic polymer admixed.

EXAMPLES

Emulsions for the following examples were prepared from either Chemische Werke Hüls B-1370 or from solutions of C-580 by a two-step process. The first step was the preparation of a course emulsion by an inversion technique. The second step utilized a Gaulin Corporation Type 15M-8TA two-stage homogenizer to reduce the emulsion droplet size. The final emulsions showed little or no settling and no coalescence over the time they were stored (generally 24 hours, but in some cases two weeks or longer).

Responses for the final latices for Examples 1–15 are collected in Table II. Similarly the responses for Examples 16–25 are collected in Table III.

EXAMPLE 1

An emulsion of Hüls B-1370 was prepared using 1750 g of crosslinker (as supplied), 17.5 g Triton X405, and 1732 g deionized water. The initial crude emulsion was prepared by weighing the Hüls B-1370 into a stainless steel beaker. A 1½-inch diameter high viscosity mixing blade was used with a Premier Dispensator (Premier Mill Corporation). The voltage was adjusted to maintain proper agitation (70–100 V) while the surfactant solution was added slowly. Inversion to an oil-in-water emulsion occurred with about ½ the surfactant solution added. The course emulsion was passed through the Gaulin homogenizer seven times with head pressure settings of 200 and 300 kg/cm² for the first and second stages, respectively. The emulsion was prepared 16 hours before its use.

The latex was prepared with the same set and quantity of ingredients as in Comparative Example 3 except that an insignificantly lower (0.8 less) level of methyl methacrylate was used. The process was identical to that of Comparative Example 3 except that 356.3 g of the above emulsion was fed into the polymerization as a separate feed, but simultaneously to the monomer feed of group (d) ingredients.

EXAMPLE 2

This synthesis was exactly the same as Example 1 except that the distribution of surfactant was different. Here the group (a) ingredients contained only 3.1 g Triton X405 and 18.3 g were added in group (e). The B-1370 emulsion was the same as in Example 1 and had been stored for 19 days.

EXAMPLE 3

The B-1370 emulsion was the same as in Example 1 and had been stored for 19 days. The emulsion, 350.3 g, was charged to the reactor in place of the ingredients of group (b) in Example 2. Other variations from Example 2 were 722.1 g butyl acrylate and 554.0 g methyl methacrylate in the group (d) ingredients and 4.2 g of 2,2'-azobis(-2-amidinopropane hydrochloride) were used in the group (e) ingredients.

EXAMPLES 4–7

The recipes and procedure for making the latices of these examples were the same as in Example 2 except that only 18.2 g of Triton X405 were used in group (e) and the emulsions were prepared with slightly different processing parameters as set out hereinbelow. They were co-fed parallel to the group (d) monomers at 356 g each.

The following emulsions of Hüls B-1370 were prepared about 16 hours before use in Examples 4–7 and in Examples 8–11 as noted:

| Use in Ex. No. | B-1370 (g) | Triton X405 (g) | Deionized Water (g) | Passes (#) | Pressure (kg/cm²) (1st/2nd) |
|---|---|---|---|---|---|
| 4 and 8 | 500 | 5 | 495 | 4 | 100/100 |
| 5 and 9 | 500 | 5 | 495 | 7 | 100/100 |
| 6 and 10 | 500 | 5 | 495 | 1 | 100/100 |
| 7 and 11 | 500 | 5 | 495 | 1 | 200/200 |

EXAMPLES 8–11

The emulsions set out immediately above were used. The recipes were the same as in Examples 4–7 except that the crosslinker emulsion (358 g) was used in place of the group (b) ingredients as per the procedure of Example 3.

EXAMPLE 12

This example is essentially identical to Example 10 except the recipe was increased by 4.65 fold and a reactor with internal coils and baffles was used to make the latex. The emulsion of B-1370 was prepared as before except the amounts were increased by a factor of 2.4 times.

EXAMPLES 13–15

A common B-1370 emulsion was prepared as per Examples 7 and 11 for these examples and was used within 24 hours. The emulsification scale was 1.6 times that given before. The recipe and procedure followed that of Example 7 except that the distribution of Triton X-405 surfactant was varied between the ingredient groups (a) and (e) as follows:

|  | (a) | (e) |
|---|---|---|
| #13 | 6.2 g | 15.2 g |
| #14 | 9.2 g | 12.0 g |
| #15 | 12.3 g | 9.1 g |

The following examples used crosslinker C-580. The responses are collected in Table III.

EXAMPLE 16

A solution of 200 g of C-580 crosslinker in an admixture of 115 butyl acrylate and 85 g methyl methacrylate was emulsified using 8 g Triton X405 and 396 g of deionized water. The crude emulsion from the invention step was processed in a single pass through the Gaulin homogenizer at pressure settings of 350 kg/cm² and 50 kg/cm² for the first and second stage, respectively. The emulsion was prepared about 16 hours before the start of the following latex synthesis.

The following ingredients, grouped as shown, were used in the quantities specified. The process was the same as used in Example 1.

| | | |
|---|---|---|
| (a) | Deionized water | 1894.2 g |
| | Triton X405 (Trademark of Rohm & Haas) | 6.2 g |
| | H₃PO₄, 85% | 2.1 g |
| (b) | BA (butyl acrylate) | 20.7 g |
| | MMA (methyl methacrylate) | 35.3 g |
| (c) | Deionized Water | 58.7 g |
| | AAP (2,2'-azobis(-2-amidinopropane) dihydrochloride | 1.4 g |
| (d) | BA (butyl acrylate) | 640.0 g |
| | MMA (methyl methacrylate) | 473.3 g |
| | HPMA (hydroxypropyl methacrylate) | 121.1 g |
| | DMAEMA ( (dimethylaminoethyl methacrylate) | 2.8 g |
| | n-DDM (n-dodecyl mercaptan) | 2.8 g |
| (e) | C-580 Emulsion from above | 427 g |
| (f) | Deionized water | 117.3 g |
| | AAP (2,2'-azobis(-2-amidinopropane) dihydrochloride | 2.8 g |
| | Triton X405 | 15.12 g |

EXAMPLES 17–19

A common emulsion of C-580 was prepared for these latices using twice the quantities of Example 16 but the same process. Example 17 was an exact replicate of Example 16. Examples 18 and 19 were identical in recipe and procedure to Example 16 except that a portion of the methyl methacrylate of the group (d) ingredients was replaced by styrene.

| | MMA | S |
|---|---|---|
| #18 | 193.3 g | 280.0 g |
| #19 | 333.3 g | 140.0 g |

EXAMPLES 20–22

A common emulsion of C-580 was prepared as in Example 16 but with a 5-fold increase in amounts. The latices were prepared by the process of Example 16. The ingredients, however, were altered for the groups (a), (d), and (e) as follows:

| | | Ex. 20 (g) | Ex. 21 (g) | Ex. 22 (g) |
|---|---|---|---|---|
| (a) | Deionized water | 1894.4 | 1894.2 | 1894.2 |
| | Triton X405 | 6.4 | 21.4 | 6.2 |
| | H₃PO₄, 85% | 2.1 | 2.1 | 2.1 |
| (d) | BA⁽¹⁾ | 455.9 | 456.5 | 333.1 |
| | MMA⁽²⁾ | 377.2 | 57.2 | 246.5 |
| | Styrene (S) | 0 | 280.0 | 0 |
| | HPMA⁽³⁾ | 121.1 | 121.1 | 121.1 |
| | DMAEMA⁽⁴⁾ | 2.8 | 2.8 | 2.8 |
| | n-DDM⁽⁵⁾ | 2.8 | 2.8 | 2.8 |
| (e) | C-580 Emulsion prepared above | 854 | 854 | 1281 |

⁽¹⁾butyl acrylate
⁽²⁾methyl methacrylate
⁽³⁾hydroxypropyl methacrylate
⁽⁴⁾dimethylaminoethyl methacrylate
⁽⁵⁾n-dodecyl mercaptan

EXAMPLE 23

A common emulsion of C-580 was prepared as in Example 16 for this example and Examples 24 and 25 except that a 2.5 fold increase in quantity was used.

The process of this example used the C-580 emulsion as a seed (not as cofeed) similar to that of Example 3 except that here the solvents for the crosslinker are ethylenically unsaturated monomers and are reactive. Thus, the ingredients are as in Example 16 except that the group (b) ingredients were omitted. The group (d) ingredients are as follows:

| | |
|---|---|
| BA (butyl acrylate) | 476.6 g |
| MMA (methyl methacrylate) | 412.5 g |
| HPMA (hydroxypropyl methacrylate) | 121.1 g |
| DMAEMA ( (dimethylamethyl methacrylate) | 2.8 g |
| n-DDM (n-dodecyl mercaptan) | 2.8 g | and the group (e) ingredients (854 g of C-580 emulsion) were used in place of group (b) as the seed charge.

EXAMPLE 24

This example used the emulsion described in Example 23 and was identical to Example 20 except that 1035 g of the above C-580 emulsion was used as group (e).

EXAMPLE 25

This example used the emulsion described in Example 23 and was identical to Example 20 except that 1.4 g dibutyl tin dilaurate was dissolved in and co-added with the group (d) ingredients.

TABLE II

RESPONSES FOR EXAMPLES 1–15

| Example No. | Addition Method | NCO:OH | Grit (g) | Particle Size (Å) | % Conv. |
|---|---|---|---|---|---|
| 1 | cofeed | .58 | 30 | 1550 | 99.0 |
| 2 | cofeed | .58 | <.1 | 5429 | 95.0 |
| 3 | seed | .58 | 1.6 | 5330 | 94.8 |
| 4 | cofeed | .58 | <.1 | 5800 | 97.3 |
| 5 | cofeed | .58 | <.1 | 4944 | 98.3 |
| 6 | cofeed | .58 | .3 | 5740 | 95.8 |
| 7 | cofeed | .58 | .2 | 6025 | 98.5 |
| 8 | seed | .58 | <.1 | 4418 | 98.0 |
| 9 | seed | .58 | <.1 | — | 98.0 |
| 10 | seed | .58 | 6.1 | — | 97.7 |
| 11 | seed | .58 | — | — | 33.0 |
| 12 | cofeed | .58 | .5 | 5330 | 98.5 |
| 13 | cofeed | .58 | <.1 | 5623 | 98.6 |
| 14 | cofeed | .58 | ca. .15 | 2740 | 98.0 |
| 15 | cofeed | .43 | 30 | 2230 | 99.0 |

The cofeed process was found to be more reproducible. The seed process using an emulsion of B-1370 resulted in nonuniform exotherm during processing and in the case of Example 11 did not convert well at all. The seed process tended to be dirtier than cofeed being substantially worse with fewer passes through the Gaulin homogenizer, Examples 10 and 11. The seeded examples with multiple passes through the homogenizer, i.e. #8 and 9, were equal to the corresponding cofed examples. As Examples 4–7 show, the cofeed process is insensitive to the number of passes through the colloid mill under the tested conditions. Aging studies were not conducted with most of these other conditions.

TABLE III
RESPONSES FOR C-580 LATICES

| Example No. | Addition Method | NCO:OH | PPHM Styrene | Grit (g) | Particle Size (Å) | % Conv. |
|---|---|---|---|---|---|---|
| 16 | cofeed | .41 | 0 | <.1 | 4600 | 98.9 |
| 17 | cofeed | .41 | 0 | <.1 | 4523 | 99.0 |
| 18 | cofeed | .41 | 20 | 15 | 1500 | 98.5 |
| 19 | cofeed | .41 | 10 | 30 | 1400 | 98.8 |
| 20 | cofeed | .83 | 0 | 6 | 4200 | 99.3 |
| 21 | cofeed | .83 | 20 | 25 | 1560 | 98.3 |
| 22 | cofeed | 1.24 | 0 | 2 | 4490 | 99.3 |
| 23 | seed | .83 | 0 | 5 | 8970 | 99.2 |
| 24 | cofeed | 1.0 | 0 | <.1 | 4590 | 98.8 |
| 25 | cofeed | .83 | 0 | 1.3 | 4610 | 98.9 |

The high grit values for Examples 18, 19, and 21 are concommitent with both the presence of styrene comonomer and the generation of smaller particle size. The smaller size latices were much less stable to mechanical shear and this may have lead to the higher grit levels. The grit for these cases *was not* the crystalline type observed in the Comparative Examples 4–6.

ELECTRODEPOSITION OF EXAMPLE 12

One gallon of the product latex from Example 12 was cation exchanged by Amberlite -200CH (Rohm & Haas) and packed in a one-inch Michel-Miller column (Ace Glass). The ion exchange was conducted at full solids, 40% non-volatile content, at about 15 ml/min flow rate.

The latex was diluted to 5% solids content for the electrodeposition. A one-liter stainless steel tank was used for the electrodepositions. The tank was divided into a larger dipping section and a smaller agitator section by a vertical wier to one side that fixed the depth of the painting bath. The wier was short of the bottom of the tank to permit recirculation of bath dispersion from the agitator section into the bottom of the dipping section. Paint dispersion flowed over the wier into the agitator section, then was impelled downwardly by a propellor-type agitator into the bottom of the dipping section. This created a circulation of the paint dispersion with a level top surface in the dipping section.

A 4"×4" (10.2 cm.) conventionally phosphated (Parker Bonderite 1000 iron phosphated) 20 ga. (0.95 mm.) steel panel was lowered over about 9 seconds to a depth of 3½" (8.9 cm.) with power on, the immersion being made about centrally to the wall confines of the dipping section of the tank. The tank was charged as an anode and the panel as a cathode with constant voltage impressed therebetween. Power was left on for 64 seconds after a panel was fully immersed, then turned off and wet coated panel withdrawn from the bath. It was rinsed with deionized water.

Four panels were coated at 25° C. bath temperature with two each at 100 V and 200 V. The wet films were smooth and adherent. The panels were baked at 191° C. for 20 minutes. Film thickness was measured with an Elektrotest F410, Elektro-Physik, Koln, West Germany.

| Trial No. | Voltage | Dry Film Thickness (Mils) | MEK |
|---|---|---|---|
| 1 | 100 | 1.65 | 70 |
| 2 | 200 | 0.95 | 40 |
| 3 | 100 | 1.55 | 70 |
| 4 | 200 | 0.85 | 55 |

The solvent resistance of the cured coating was determined by wiping a rag soaked with methylethyl ketone, MEK, back and forth across the coating. The portion of rag in contact with the film was renewed every ten strokes (forth and back being one stroke). The reported number is the number of strokes required to remove the coating to show bare metal.

What is claimed is:

1. In a process for preparing a cationic amine-stabilized electrocoating composition comprising
   (a) 95 to 45 weight percent of a thermosetting latex polymer prepared in water by emulsion polymerization of vinyl monomers comprising non-functional monomers, monomers having functional groups adapted to cure with a latent blocked isocyanate and amine functional monomers which when ionized or neutralized with acid impart cationic properties to the latex; and
   (b) 5 to 55 weight percent of a non-polymerizable water insoluble blocked isocyanate; wherein (a)+(b) on a solids basis total 100 percent;
   the improvement which comprises conducting said emulsion polymerization of said vinyl monomers in the presence of a water insoluble non-polymerizable latent blocked isocyanate by
   (1) forming a course preemulsion of a blocked isocyanate in water with a surfactant and either at least a portion of one or more polymerizable monomers or with a non-polymerizable solvent;
   (2) homogenizing said course preemulsion to produce a fine emulsion having an average particle size of less than 3 microns; and
   (3) emulsion polymerizing vinyl monomers in a reactor into which the said fine emulsion was previously batch charged or is being continuously fed over some interval of time concomitant with the emulsion polymerization.

2. The process of claim 1 wherein the emulsion comprises a mixture of non-polymerizable blocked isocyanate in water, one or more cationic or nonionic surfactants, and at least a portion of one or more of polymerizable vinyl monomers.

3. The process of claim 1 wherein the emulsion comprises a blocked isocyanate and a non-polymerizable solvent.

4. The process of claim 1 wherein the latex is an acrylic latex and the blocked isocyanate is selected from the group consisting of bis(4-isocyanatophenyl)methane blocked with either caprolactam or a ketoxime; an adduct of one mole of trimethylol propane and three moles of isophorone diisocyanate which is subsequently blocked with either a ketoxime or caprolactam; an isocyanurate trimer adduct of isophorone diisocyanate which is blocked with either a ketoxime or caprolactam; an isocyanurate trimer adduct of toluene diisocyanate which is blocked with either a ketoxime or caprolactam; and isophorone diisocyanate blocked with either a ketoxime or caprolactam; the non-functional vinylic monomers comprise styrene, acrylate ester and methacrylate ester monomers; the functional monomers are hydroxyalkyl acrylates and hydroxyalkyl methacrylates; and the cationic-precursor monomers are aminoalkyl, alkylaminoalkyl, and dialkylaminoalkyl acrylates and methacrylates; and the polymerization system contains an ionizing acid sufficient to at least partially neutralize and ionize the amine functional groups and impart cation activity to the latex polymer.

5. The process of claim 4 wherein the latex comprises methyl methacrylate, butyl acrylate, hydroxypropyl methacrylate, and N,N-dimethyl-2-aminoethyl methacrylate, the ionizing acid is phosphoric acid and the polymerization is initiated by 2,2'-azobis(2-amidino propane)dihydrochloride.

6. A substrate coated with the thermosetting latex prepared by the process of claim 2 wherein the monomers comprise butyl acrylate, hydroxypropylmethacrylate, dimethylaminoethyl methacrylate, and styrene.

7. The process of claim 4 wherein the thermosetting latex is derived from
   (a) 80 to 95 weight percent non-functional monomers;
   (b) 0.50 to 10 weight percent functional monomers;
   (c) 0.05 to 10 weight percent amine-containing cationic precursor monomers; and wherein (a)+(b)+(c) total 100% on a solids basis.

8. In a process for providing a cationic amine-stabilized polymeric composition comprising blocked isocyanate and a thermosetting latex polymer prepared in water by emulsion polymerization of vinyl monomers the improvement wherein, the process steps comprise:
   (a) forming a course emulsion of a non-polymerizable blocked isocyanate in water with a surfactant and at least a portion of one or more polymerizable vinyl monomers selected from the group consisting of non-functional monomers, functional group-containing monomers, and amine-containing cationic-precursor monomers;
   (b) homogenizing said course emulsion to produce a fine emulsion having an average particle size of less than 3 microns; and
   (c) emulsion polymerizing vinyl monomers in a reactor into which the said fine emulsion is batch charged prior to the polymerization or is added concurrently with the vinyl monomers wherein the polymerization is conducted in the presence of water, a surfactant and an ionizing acid sufficient to at least partially neutralize the amine functionality to provide a thermosetting latex, said latex containing on a solids weight basis between 5 and 55% blocked isocyanate and between 95 and 45% copolymerized monomer and wherein said monomers comprise a major portion of non-functional vinyl monomers and a minor portion of functional group-containing and amine-containing cationic precursor monomers.

9. A non-pigmented paint composition comprising the thermosetting latex prepared by the process of claim 1.

10. A pigmented paint composition comprising the thermosetting latex of claim 1.

* * * * *